United States Patent [19]
Higuchi

[11] Patent Number: 5,435,453
[45] Date of Patent: Jul. 25, 1995

[54] BRANCH JOINT BOX

[75] Inventor: Eiji Higuchi, Yokkaichi, Japan

[73] Assignee: Sumitomo Wiring Systems, Ltd., Yokkaichi, Japan

[21] Appl. No.: 231,828

[22] Filed: Apr. 25, 1994

[30] Foreign Application Priority Data

Jun. 25, 1993 [JP] Japan .................. 5-034577 U

[51] Int. Cl.6 .................................... H02G 3/14
[52] U.S. Cl. ........................... 220/3.8; 220/3.94
[58] Field of Search .......... 220/3.2, 3.8, 3.92, 220/3.94, 445, 446

[56] References Cited

U.S. PATENT DOCUMENTS

| | | | |
|---|---|---|---|
| 591,884 | 10/1897 | Ryan | 220/3.94 |
| 872,458 | 12/1907 | Sanborn et al. | 220/3.94 |
| 2,808,090 | 10/1957 | Casalino | 220/445 |
| 3,912,106 | 10/1975 | Traupe | 220/3.94 |
| 4,620,061 | 10/1986 | Appleton | 220/3.8 |
| 4,626,617 | 12/1986 | Rye | . |
| 4,699,289 | 10/1987 | You | 220/3.8 |
| 4,746,017 | 5/1988 | Howard et al. | 220/445 |
| 5,054,956 | 10/1991 | Huang | 220/3.8 |
| 5,226,556 | 7/1993 | Lu | 220/445 |
| 5,258,889 | 11/1993 | Belanger, Jr. | . |

FOREIGN PATENT DOCUMENTS 0225725  6/1987  European Pat. Off. .
2227613  8/1990  United Kingdom .

*Primary Examiner*—Stephen J. Castellano
*Attorney, Agent, or Firm*—Sandler, Greenblum & Bernstein

[57] ABSTRACT

A branch joint box including a lower casing and an upper casing, in which the upper casing is fitted into the lower casing and an upper cover is mounted on an upper portion of an outer peripheral wall of the lower casing through a packing, the branch joint box comprising: a rib member for correcting warpage of the outer peripheral wall of the lower casing, which is provided on either one of an inner surface of the outer peripheral wall of the lower casing and an outer surface of an outer peripheral wall of the upper casing so as to protrude into a gap between the inner surface of the outer peripheral wall of the lower casing and the outer surface of the outer peripheral wall of the upper casing.

9 Claims, 4 Drawing Sheets

BRANCH JOINT BOX

BACKGROUND OF THE INVENTION

The present invention generally relates to a branch joint box for performing branching of a circuit through branch joint of connectors of a wiring harness for a motor vehicle and more particularly, to prevention of penetration of water into the branch joint box.

In a branch joint box used for jointing a wiring harness for a motor vehicle to various electrical parts by branching, branch joint points are concentrated at one spot so as to reasonably and economically joint a circuit by branching. In response to rise of densities of wires of the wiring harness, various types of branch joint boxes have been developed.

FIGS. 1 and 2 show one example of known branch joint boxes. This known branch joint box includes a lower casing 1 and an upper casing 2. The upper casing 2 is fitted into the lower casing 1 so as to form a casing body 7. An upper side of the casing body 7, i.e., an upper portion of the lower casing 1 is closed by an upper cover 4, while a lower side of the casing body 7 is closed by a lower cover (not shown).

Since the branch joint box is provided in an engine room, etc. of the motor vehicle, countermeasures for preventing penetration of rainwater, etc. into the branch joint box and discharging the penetrated rainwater, etc. from the branch joint box are taken. As one of such countermeasures, a packing 3 is provided between an outer peripheral wall 1a of the lower casing 1 and the upper cover 4.

The lower casing 1 is made of synthetic resin and is formed by injecting synthetic resin into a cavity defined between an inner mold and an outer mold. However, in general, such a case may happen frequently at the time of molding of synthetic resin that the inner mold reaches a high temperature but the outer mold is of a relatively low temperature. By this temperature difference between the inner mold and the outer mold, the outer peripheral wall 1a of the molded lower casing 1 may warp inwardly as shown in FIG. 3 and as indicated by the two-dot chain lines in FIG. 4. If this warpage of the outer peripheral wall 1a of the lower casing 1 is produced, an upper portion of the outer peripheral wall 1a of the lower casing 1 is brought out of contact with the packing 3 as shown in FIG. 3 so as to form a gap therebetween and thus, rainwater, etc. may penetrate into the casing body 7 from this gap.

Therefore, conventionally, it has been necessary to take such a measure that molds are preliminarily manufactured in view of warpage of the outer peripheral wall 1a of the lower casing 1 or special molds leading to less warpage of the outer peripheral wall 1a of the lower casing 1 are employed, thereby resulting in rise of manufacturing cost of the molds. Meanwhile, if it is found that once molds for the lower casing 1 have been manufactured, the lower casing 1 molded by using the molds warps, the molds should be replaced by the above mentioned molds manufactured in view of warpage of the outer peripheral wall 1a of the lower casing 1 or the special molds leading to less warpage of the outer peripheral wall 1a of the lower casing 1, so that warpage of the outer peripheral wall 1a of the lower casing 1 cannot be corrected quickly.

SUMMARY OF THE INVENTION

Accordingly, an essential object of the present invention is to provide, with a view to eliminating the above mentioned drawbacks inherent in conventional branch joint boxes, a branch joint box in which warpage of a lower casing can be corrected without raising manufacturing cost of molds.

Another important object of the present invention is to provide a branch joint box in which, even when a lower casing manufactured by using known molds warps, warpage of the lower casing can be eliminated quickly.

In order to accomplish these objects of the present invention, a branch joint box according to the present invention includes a lower casing and an upper casing, in which the upper casing is fitted into the lower casing and an upper cover is mounted on an upper portion of an outer peripheral wall of the lower casing through a packing, the branch joint box comprising: a rib member for correcting warpage of the outer peripheral wall of the lower casing, which is provided on either one of an inner surface of the outer peripheral wall of the lower casing and an outer surface of an outer peripheral wall of the upper casing so as to protrude into a gap between the inner surface of the outer peripheral wall of the lower casing and the outer surface of the outer peripheral wall of the upper casing.

In accordance with the present invention, the rib member is provided on either one of the inner surface of the outer peripheral wall of the lower casing and the outer surface of the outer peripheral wall of the upper casing so as to protrude into the gap between the outer peripheral walls of the lower and upper casings so as to depress the outer peripheral wall of the lower casing outwardly such that inward warpage of the outer peripheral wall of the lower casing is corrected. Therefore, molds manufactured in view of warpage of the outer peripheral wall of the lower casing or special molds leading to less warpage of the outer peripheral wall of the lower casing are not required to be employed as molds for molding the lower casing and thus, molds for molding the lower and upper casing can be manufactured at low cost. Furthermore, since the molds manufactured in view of warpage of the outer peripheral wall of the lower casing are not required to be employed and the rib forming portions may be merely provided on known molds, warpage of the outer peripheral wall of the lower casing can be eliminated quickly.

BRIEF DESCRIPTION OF THE DRAWINGS

These objects and features of the present invention will become apparent from the following description taken in conjunction with the preferred embodiment thereof with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
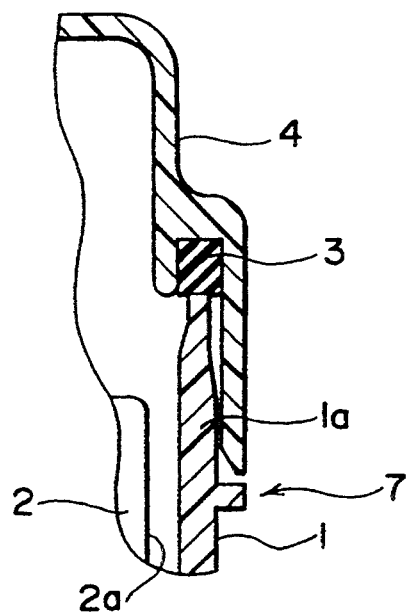
FIG. 1 is a fragmentary sectional view of a prior art branch joint box (refered to above)
Figure 2:
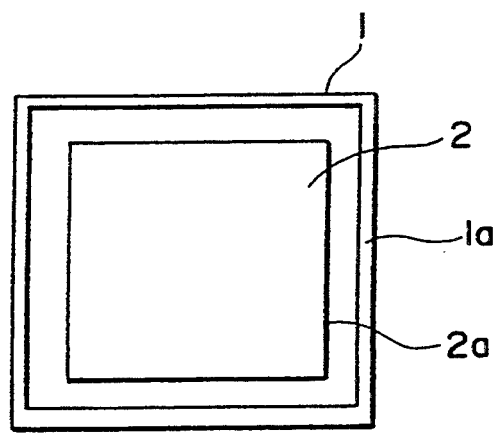
FIG. 2 is a schematic top plan view of the prior art branch joint box of FIG. 1 (refered to above)
Figure 3:
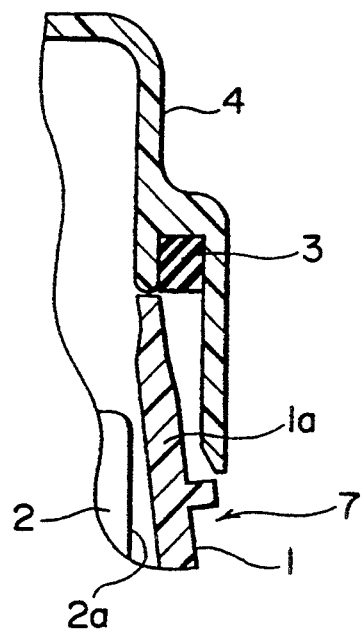
FIG. 3 is a fragmentary sectional view showing production of warpage of the prior art branch joint box of FIG. 1 (refered to above)
Figure 4:
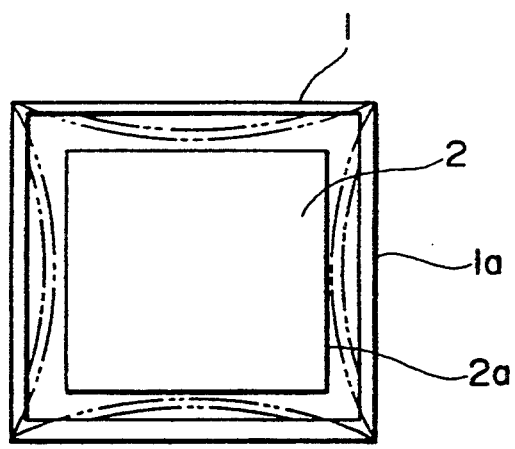
FIG. 4 is a schematic top plan view of the prior art joint box of FIG. 3 (refered to above)
Figure 5:
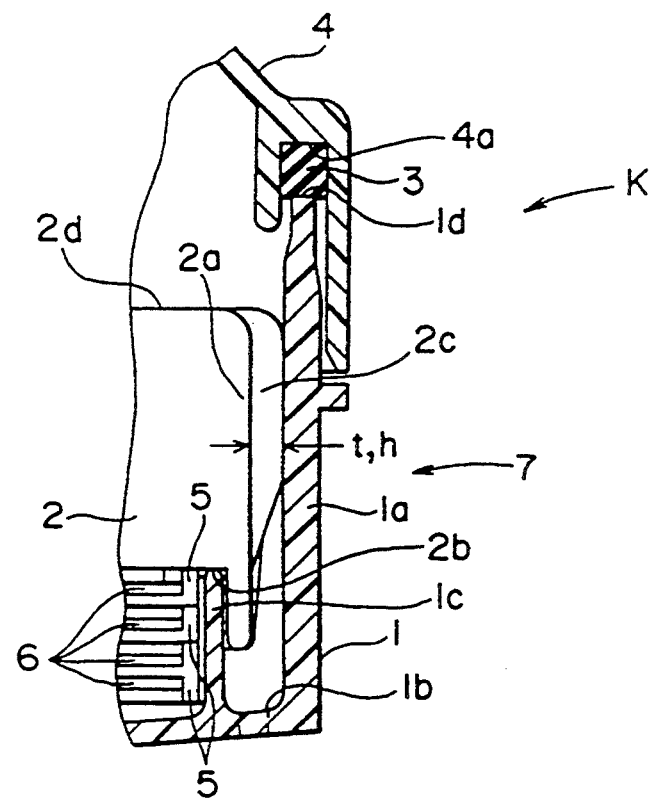
FIG. 5 is a fragmentary sectional view of a branch joint box according to the present invention.
Figure 6:
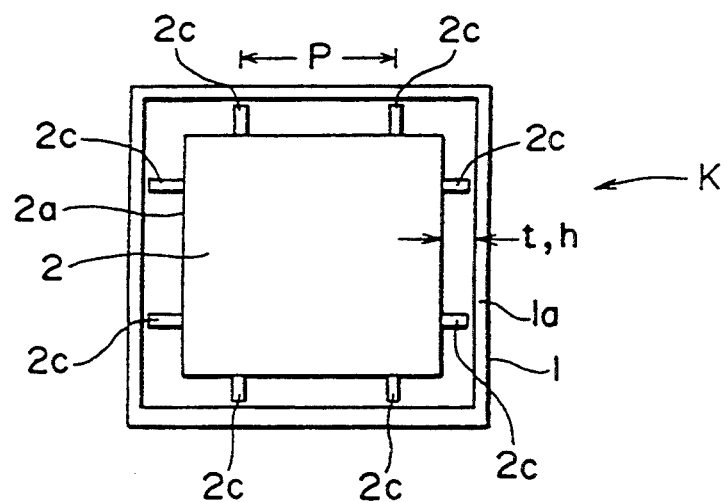
FIG. 6 is a schematic top plan view of the branch joint box of FIG. 5.

Referring now to the drawings, there is shown in FIGS. 5 and 6, a branch joint box K according to one embodiment of the present invention. The branch joint box K includes a lower casing 1 and an upper casing 2. The upper casing 2 is fitted into the lower casing 1 so as to form a casing body 7. Meanwhile, an upper portion of the lower casing 1 is closed by an upper cover 4, while a lower portion of the casing body 7 is closed by a lower cover (not shown).

A projection 1c is formed on a bottom 1b of the lower casing 1 so as to be fitted into the upper casing 2. Height of the outer peripheral wall 1a of the lower casing 1 is set such that an upper end 1d of the outer peripheral wall 1a is disposed above an upper end 2d of the upper casing 2 when the upper casing 2 has been fitted into the lower casing 1.

The upper cover 4 is mounted on the upper portion of the outer peripheral wall 1a of the lower casing 1. A groove 4a is formed at an outer periphery of the upper cover 4 so as to receive a packing 3. Thus, the packing 3 is disposed between the upper end 1d of the outer peripheral wall 1a of the lower casing 1 and the upper cover 4 so as to prevent penetration of water from outside into the casing body 7.

On the other hand, a plurality of insulating plates 5 and a plurality of bus bars 6 are accommodated in the upper casing 2 so as to be piled on one another. By inserting the projection 1c of the lower casing 1 into a recess 2b formed on a bottom of the upper casing 2, the upper casing 2 is fitted into the lower casing 1 such that a gap t is defined between an inner surface of the outer peripheral wall 1a of the lower casing 1 and an outer surface of an outer peripheral wall 2a of the upper casing 2.

Meanwhile, a plurality of vertically extending ribs 2c are integrally formed on the outer surface of the outer peripheral wall 2a of the upper casing 2 at a predetermined outer peripheral pitch P so as to protrude into the gap t. A height h of the ribs 2c is so set as to be equal to a width of the gap t.

In the branch joint box K of the present invention, even if inward warpage of the outer peripheral wall 1a of the lower casing 1 is produced, the outer peripheral wall 1a of the lower casing 1 is depressed outwardly by the ribs 2c in the course of fitting of the outer surface of the outer peripheral wall 2a of the upper casing 2 into the inner surface of the outer peripheral wall 1a of the lower casing 1 such that inward warpage of the outer peripheral wall 1a of the lower casing 1 is corrected. As a result, since the upper end 1d of the outer peripheral wall 1a of the lower casing 1 is positively brought into contact with the packing 3 in the upper cover 4, interior of the casing body 7 is securely sealed against outside rainwater, etc. and thus, the rainwater, etc. are prevented from penetrating into the casing body 7.

Furthermore, to this end, rib forming portions for forming the ribs 2c may be merely provided on molds for forming the upper casing 2. Therefore, in the present invention, it is not necessary to prepare molds manufactured in view of warpage of the outer peripheral wall 1a of the lower casing 1 or special molds leading to less warpage of the outer peripheral wall 1a of the lower casing 1, thereby resulting in reduction of manufacturing cost of molds for forming the lower and upper casings 1 and 2. Moreover, even in the case where warpage of the lower casing 1 formed by known molds is produced, the rib forming portions referred to above may be merely provided on the molds for forming the upper casing 2 and thus, warpage of the outer peripheral wall 1a of the lower casing 1 can be eliminated quickly.

Figure 7:
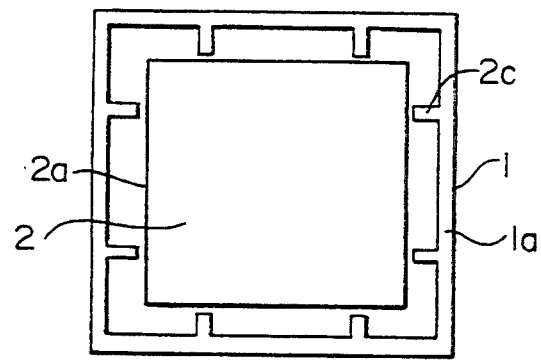
FIG. 7 is a schematic top plan view of another embodiment of the branch joint box of FIG. 6.
Figure 8:
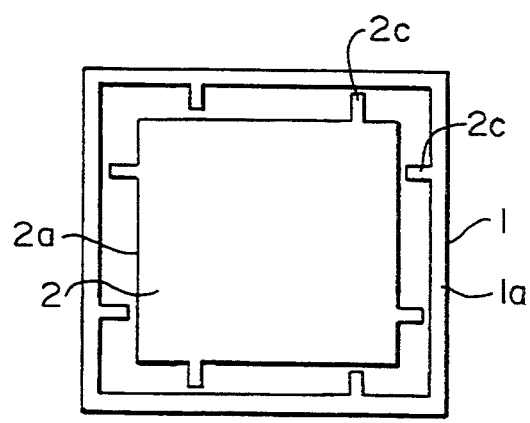
FIG. 8 is a schematic top plan view of yet another embodiment of the branch joint box of FIG. 6.

Meanwhile, the present invention is not restricted to the above mentioned embodiment but can be modified variously. For example, in the embodiment of FIG. 6, the ribs 2c for correcting warpage of the outer peripheral wall 1a of the lower casing 1 are formed on the outer surface of the outer peripheral wall 2a of the upper casing 2. However, such warpage correcting ribs may also be provided on the inner surface of the outer peripheral wall 1a of the lower casing 1, as shown in FIG. 7. Additionally, as shown in FIG. 8 the warpage correcting ribs may also be provided alternately on the outer surface of the outer peripheral wall 2a of the upper casing 2 and the inner surface of the outer peripheral wall 1a of the lower casing 1. In addition, locations of the warpage correcting ribs 2c are not limited to those shown in FIGS. 6–8 but the warpage correcting ribs 2c may be properly provided at spots where warpage of the outer peripheral wall 1a of the lower casing 1 readily takes place.

As is clear from the foregoing description of the branch joint box of the present invention, the ribs protruding into the gap between the outer peripheral walls of the lower and upper casings are provided on either one of the outer surface of the outer peripheral wall of the upper casing and the inner surface of the outer peripheral wall of the lower casing so as to depress the outer peripheral wall of the lower casing outwardly such that inward warpage of the outer peripheral wall of the lower casing is corrected. Therefore, in accordance with the present invention, since the upper end of the outer peripheral wall of the lower casing is held in contact with the packing provided between the lower casing and the upper cover, it is possible to positively prevent penetration of rainwater, etc. into the branch joint box.

Meanwhile, since molds manufactured in view of warpage of the outer peripheral wall of the lower casing or special molds leading to less warpage of the outer peripheral wall of the lower casing are not required to be employed as molds for molding the lower casing, manufacturing cost of molds for molding the lower and upper casings can be reduced. Furthermore, even when the outer peripheral wall of the lower casing molded by using known molds warps, warpage of the outer peripheral wall of the lower casing can be eliminated by merely providing rib forming portions on the known molds and thus, warpage of the outer peripheral wall of the lower casing can be eliminated quickly.

What is claimed is:

1. A branch joint box comprising:
   a lower casing and an upper casing fitted into the lower casing so as to form a casing body, said lower casing having an outer peripheral wall, said outer peripheral wall having an upper portion;

an upper cover mounted on said upper portion of said outer peripheral wall;

a packing disposed between said upper portion of said outer peripheral wall and said cover; and a rib member for correcting warpage of the outer peripheral wall of the lower casing, which is provided on either one of an inner surface of the outer peripheral wall of the lower casing and an outer surface of an outer peripheral wall of the upper casing so as to protrude into a gap between the inner surface of the outer peripheral wall of the lower casing and the outer surface of the outer peripheral wall of the upper casing;

said rib member located and oriented with respect to said packing so as to maintain said packing in positive contact with said upper portion of said outer peripheral wall and prevent penetration of water beyond said packing into the interior of said branch joint box.

2. A branch joint box of claim 1 wherein said upper portion of said outer peripheral wall has an upper end and said packing is disposed between said upper end and said upper cover.

3. A branch joint box of claim 1 wherein said rib member is oriented generally transversely to said packing.

4. A branch joint box of claim 1 wherein the width of said gap is substantially equal to the height of said rib member.

5. A branch joint box of claim 1 wherein said outer peripheral wall of said lower casing is depressed outwardly by said rib member such that inward warpage of said outer peripheral wall is corrected.

6. A branch joint box of claim 1 wherein said rib member is formed on the outer surface of said outer peripheral wall of said upper casing.

7. A branch joint box of claim 1 wherein said rib member is formed on the inner surface of said outer peripheral wall of said lower casing.

8. A branch joint box of claim 1 comprising a plurality of rib members and wherein said rib members are formed alternately on said outer surface of said outer peripheral wall of said upper and on the inner surface of said outer peripheral wall of said lower casing.

9. A branch joint box of claim 1 wherein said rib member is located where warpage of said outer peripheral wall of said lower casing readily takes place.

* * * * *

UNITED STATES PATENT AND TRADEMARK OFFICE
CERTIFICATE OF CORRECTION

PATENT NO. : 5,435,453
DATED : Jul. 25, 1995
INVENTOR(S) : Eiji HIGUCHI

It is certified that error appears in the above-indentified patent and that said Letters Patent is hereby corrected as shown below:

At column 5, line 19 (claim 1, line 22, after "wall" insert --of the lower casing--; and
At column 6, line 20 (claim 8, line 4), after "upper" insert ---casing---.

Signed and Sealed this

Twentieth Day of August, 1996

Attest:

BRUCE LEHMAN

Attesting Officer

Commissioner of Patents and Trademarks